(No Model.)
P. SIEVERT.
PROCESS OF PRODUCING FLAT OBJECTS OF GLASS.
No. 530,289. Patented Dec. 4, 1894.
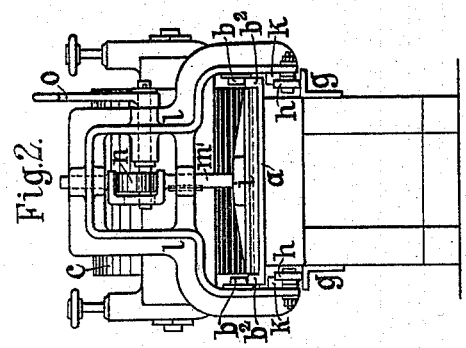
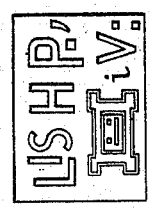
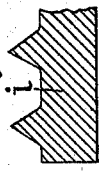
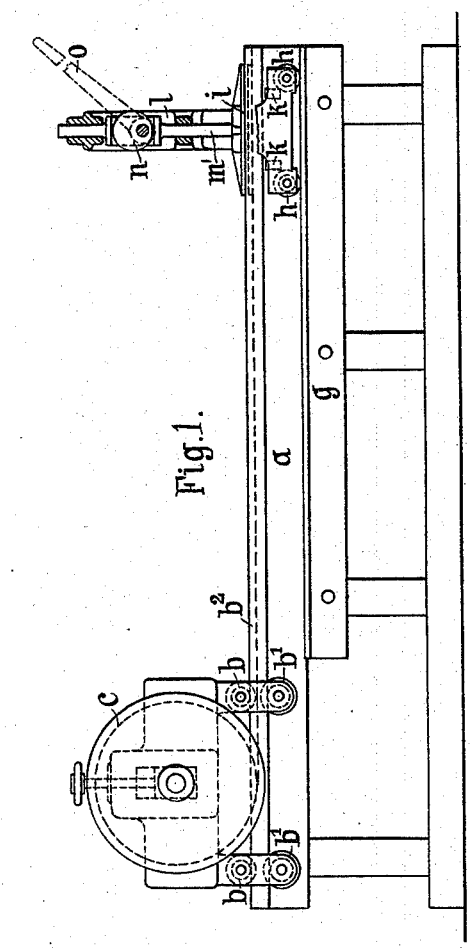
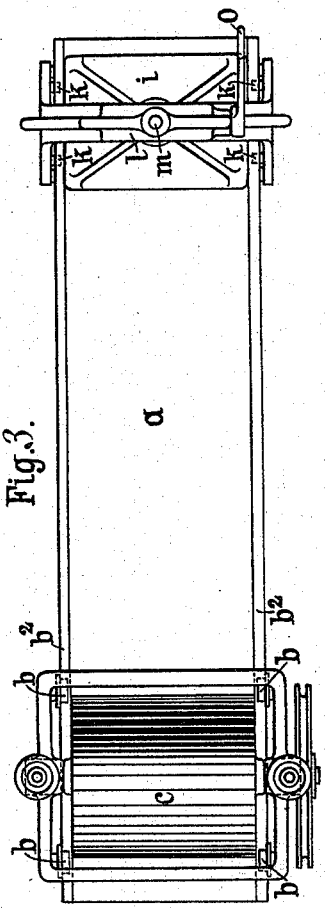
Witnesses:
George Barry.
Inventor:—
Paul Sievert
by attorneys
Brown & Seward

UNITED STATES PATENT OFFICE.

PAUL SIEVERT, OF DÖHLEN, NEAR DRESDEN, GERMANY.

PROCESS OF PRODUCING FLAT OBJECTS OF GLASS.

SPECIFICATION forming part of Letters Patent No. 530,289, dated December 4, 1894.

Application filed November 1, 1892. Serial No. 450,674. (No model.) Patented in Germany May 3, 1892, No. 67,292; in France September 29, 1892, No. 224,636; in Belgium October 5, 1892, No. 101,611; in England October 6, 1892, No. 17,848, and in Austria-Hungary May 8, 1893, No. 49,854 and No. 90,624.

*To all whom it may concern:*

Be it known that I, PAUL SIEVERT, glass-manufacturer, of Döhlen, near Dresden, in the Kingdom of Saxony, German Empire, have invented certain new and useful Improvements in the Process of Producing Flat Objects of Glass and Means for Carrying Out such Process, (which have been patented in Germany by Patent No. 67,292, dated May 3, 1892; in France by Brevet d'Invention No. 224,636, dated September 29, 1892; in Belgium by Brevet d'Invention No. 101,611, dated October 5, 1892; in Great Britain by Patent No. 17,848, dated October 6, 1892, and in Austria-Hungary by Privilegium No. 49,854 and No. 90,624, dated May 8, 1893,) of which the following is a specification.

This invention relates to a process for producing flat objects or articles of glass and the process consists, first, in preparing a flat sheet of glass by pouring molten glass on a table and rolling it down to proper thickness; second, in stamping into the glass while still in a plastic state the contours of the objects or articles to be produced; third, in grinding or polishing the plate of glass (after its having been properly annealed) on one side and thereby severing the plate by such grinding or polishing process into the different objects or articles which are intended to be produced.

In using colored, opaque, colorless or any convenient sort of glass for my object in view, I may produce letters, figures, frames, rings or any other articles of a flat shape in an easy, cheap and convenient manner because I obviate the handling and grinding the surface and bottom of each object separately, by not stamping them out entirely of the plastic glass, but by allowing them to remain coherent in the plate or sheet of glass, which allows of grinding or polishing the plate or sheet in the usual way, such grinding or polishing on the lower side of the glass sheet or plate may be so far extended, that the small thickness of glass material between the deepest point of the contour and the under face of the glass sheet or plate is removed by the grinding or polishing process.

For stamping the contours of the articles to be produced into the glass I prefer to use a press with a plate, which at its under side is provided with fillets of a conical shape, said fillets forming the contours of the objects or articles to be produced and said plate being suitably arranged to be pressed down. I use such a press plate in combination with a table, upon which the molten glass is poured and with a roller, for rolling the molten glass down to proper thickness.

The press with its plate is arranged over the sheet of glass and, while the latter is still in a plastic condition, said press with the press plate is shifted by means of wheels and track over the glass sheet step by step, according to the length of the glass sheet and is operated to stamp into the entire glass sheet consecutively the contours on the press plate.

In the annexed drawings I have shown in Figure 1 a side view, in Fig. 2 an end view, and in Fig. 3 a plan of the complete apparatus for stamping the contours into the sheet of glass. Fig. 4 is a face view of a plate employed in this apparatus, and Fig. 5 represents a vertical section, on a larger scale, of part of the same plate.

$a$ is the table to receive the molten glass.

$c$ is the roller for rolling the molten glass down to proper thickness.

The roller $c$ is mounted on a carriage with wheels $b$ and counter wheels $b'$, the wheels $b$ running on rails $b^2$ at both sides of the table $a$, the wheels $b'$ taking underneath said rails.

The roller $c$ may be adjusted in its bearings according to the thickness of articles or objects to be produced.

$g$ are rails on both sides along the table $a$ for carrying the press. On these rails the carriage and framing $l$ of the press may run by means of the wheels $h$. The carriage is provided with rollers, bolts or brackets $k$, arranged to take underneath the rails $b^2$, if pressure is exerted to press the press plate downwardly. In the framing $l$ guides are arranged for the vertical spindle $m$ which at its lower end carries the press plate $i$, which press plate is provided at its under side with, as shown in Fig. 5, conical or V-shaped fillets forming the contours of the objects or articles to be produced. The spindle $m$ is cranked and an eccentric disk $n$ is placed into the crank, which disk by being rotated with its shaft by means of lever o will cause the spindle to lower down and to press the plate i with the fillets on its under side to enter into the glass, producing thereby in the glass the contours of the flat objects or articles to be produced.

In carrying out my process, I pour molten glass on plate a. I afterward roll the molten glass down to the required thickness and I press down by lever o the press plate i for the purpose mentioned. I then shift the press for the required distance and I repeat the pressing down of plate i, and this shifting and pressing is repeated so often as the length of glass sheet will allow or require. Of course this repeated pressing of contours into the glass sheet must be so timed that the glass sheet is in a proper plastic condition to receive the impressions of the contours. If the sheet of glass thus provided with contours all over its upper surface is in a condition to be removed from the table a, I transport it in an annealing oven and after having been properly annealed, I subject the glass sheet to a grinding or polishing operation. This grinding or polishing operation may be completed first on the upper side and thereafter on the lower side, this operation on the lower side being carried out to such an extent that the small thickness of glass between the depth of the contours and the lower surface is removed, whereby I am now enabled to collect the ready ground flat articles of glass singly or separately.

I may dispense with the roller c for rolling down the sheet of glass to proper thickness in such cases in which the extension of the sheet is comparatively small. In such cases, a press plate with smooth under side or face may be used to press the poured molten glass flat and to the required thickness and thereafter the press plate i with the contours may come into operation to press into the thus prepared flat sheet of glass the contours of the flat articles or objects to be produced.

If I desire to produce flat articles or objects of glass with a convex surface, which I am enabled to form by my process of stamping the conical shaped fillets into the plastic sheet of glass, I do not grind or polish the upper surface of the sheet of glass, but I limit this grinding and polishing operation to the lower side of the glass sheet, severing thereby such sheet into the single and separate articles or objects of glass which now have a plane under side and a convex upper side, which objects or articles will have a very fine appearance by the rounded off edges of their upper sides.

The flat glass-ware produced by the process herein described is not a part of the present invention. Neither is the apparatus herein described and shown as used in said process; but the said apparatus is the subject of my application for United States Patent, Serial No. 493,973, filed December 18, 1893, patented October 30, 1894, No. 528,940, and the said glass-ware is the subject of my application for United States Patent, Serial No. 505,832, filed March 31, 1894.

What I claim is—

The process for producing flat articles or objects of glass, consisting in first pouring molten glass on a table, next rolling or pressing the so poured glass down to produce a sheet of proper thickness, next stamping into the said sheet while yet plastic the contours of the articles or objects to be produced, afterward annealing the said sheet and finally grinding the said sheet on one side to separate or sever the flat articles or objects out of the said sheet of glass, substantially as herein set forth.

In testimony that I claim the foregoing as my invention I have signed my name in presence of two subscribing witnesses.

PAUL SIEVERT.

Witnesses:
GEORG RICHTER,
WILHELM WIESENHÜTTER.